(12) United States Patent
Kurashima (10) Patent No.: US 9,291,108 B2
(45) Date of Patent: Mar. 22, 2016

(54) ENGINE CONTROL DEVICE AND CONTROL METHOD

(71) Applicant: Hitachi Automotive Systems, Ltd., Hitachinaka-shi, Ibaraki (JP)

(72) Inventor: Yoshikuni Kurashima, Isesaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/432,305

(22) PCT Filed: Mar. 7, 2014

(86) PCT No.: PCT/JP2014/055948
§ 371 (c)(1),
(2) Date: Mar. 30, 2015

(87) PCT Pub. No.: WO2014/136935
PCT Pub. Date: Sep. 12, 2014

(65) Prior Publication Data
US 2015/0252736 A1    Sep. 10, 2015

(30) Foreign Application Priority Data

Mar. 7, 2013 (JP) ................................. 2013-045141

(51) Int. Cl.
*F02B 75/04* (2006.01)
*F02D 15/02* (2006.01)
*F02D 41/04* (2006.01)
(Continued)

(52) U.S. Cl.
CPC .............. *F02D 15/02* (2013.01); *F02B 17/005* (2013.01); *F02D 1/16* (2013.01); *F02D 37/00* (2013.01); *F02D 41/047* (2013.01); *F02D 41/345* (2013.01); *F02D 41/401* (2013.01); *F02D 41/402* (2013.01); *F02M 57/005* (2013.01); *F02M 61/14* (2013.01); *Y02T 10/44* (2013.01)

(58) Field of Classification Search
CPC ..... F02B 75/048; F02D 15/02; F02D 41/401; F02D 1/16; F02D 41/345
USPC .................. 123/48 B, 78 BA, 78 E, 78 F, 435
See application file for complete search history.

(56) References Cited

U.S. PATENT DOCUMENTS

| 6,516,757 | B2 * | 2/2003 | Aoyama | ............... F02B 75/048 123/78 R |
| 7,228,838 | B2 * | 6/2007 | Aoyama | ............... F02B 75/048 123/197.4 |
| 8,720,412 | B2 * | 5/2014 | Matsumura | ........... F02D 41/401 123/299 |
| 2011/0155097 | A1 | 6/2011 | Matsumura et al. | |

FOREIGN PATENT DOCUMENTS

| JP | 2005-139989 | 6/2005 |
| JP | 2009-236107 | 10/2009 |

(Continued)

*Primary Examiner* — Hai Huynh
(74) *Attorney, Agent, or Firm* — Foley & Lardner LLP (57) ABSTRACT

The present invention relates to a control device and a control method for an engine that includes a compression ratio variable mechanism for changing a top dead center position of a piston and a fuel injector for directly injecting a fuel into a cylinder. In the control device and the control method for the engine according to the invention, when a compression ratio is increased by the compression ratio variable mechanism, an injection timing, a fuel pressure, the number of times of split injections, and the like, in a fuel injection of the fuel injector are changed, to reduce a fuel adhering to a piston crown surface.

10 Claims, 6 Drawing Sheets

(51) Int. Cl.
  *F02D 41/34* (2006.01)
  *F02D 37/00* (2006.01)
  *F02B 17/00* (2006.01)
  *F02D 1/16* (2006.01)
  *F02M 57/00* (2006.01)
  *F02M 61/14* (2006.01)
  *F02D 41/40* (2006.01)

(56) References Cited

FOREIGN PATENT DOCUMENTS

| | | |
|---|---|---|
| JP | 2010-242583 | 10/2010 |
| JP | 2011-132898 | 7/2011 |
| JP | 2012-255385 | 12/2012 |
| WO | WO 2014/129225 A1 * | 8/2014 ............. F02D 15/02 |

* cited by examiner

ENGINE CONTROL DEVICE AND CONTROL METHOD

TECHNICAL FIELD

The present invention relates to a control device and a control method for an engine provided with a compression ratio variable mechanism for changing a top dead center position of a piston and a fuel injector for directly injecting a fuel into a cylinder.

BACKGROUND ART

Patent Document 1 discloses an in-cylinder direct injection type internal combustion engine provided with a compression ratio variable mechanism. In the internal combustion engine, in a case in which an actual compression ratio is higher than a target compression ratio, a fuel injection is performed by combining an intake stroke injection and a compression stroke injection, and an injection start timing of the compression stroke injection is retarded as the compression ratio decreases.

REFERENCE DOCUMENT LIST

Patent Document

Patent Document 1: Japanese Patent Application Laid-open Publication No. 2009-236107

SUMMARY OF THE INVENTION

Problems to be Solved by the Invention

An amount of particulate matter (PM) emission in an engine provided with a fuel injector that directly injects a fuel into a cylinder, varies according to the fuel adhering to a piston crown surface.

In addition, in an engine provided with a compression ratio variable mechanism that changes a top dead center position of a piston, a distance between the piston and a fuel injector is changed according to a compression ratio.

Therefore, in a state of a high compression ratio in which the distance between the piston and the fuel injector is shortened, the fuel easily adheres to the piston crown surface, and therefore the amount of PM emission may increases.

The invention has been made in view of the above problems, and an object thereof is to provide a control device and a control method for an engine provided with a compression ratio variable mechanism and a fuel injector that directly injects a fuel into a cylinder, capable of reducing the fuel adhering to a piston crown surface.

Means for Solving the Problems

Therefore, a control device for an engine according to the invention includes an injection controller that sets an injection timing of a fuel injector to be away from the top dead center as an increase rate of a compression ratio by a compression ratio variable mechanism increases.

A control method for an engine according to the invention includes the steps of: controlling a compression ratio variable mechanism according to an operational condition; and setting an injection timing of a fuel injector to be away from the top dead center as an increased rate of a compression ratio of a compression ratio variable mechanism increases.

Effects of the Invention

According to the invention, it is possible to prevent the amount of a fuel adhering to a piston crown surface from increasing as the compression ratio increases, and thus it is possible to prevent the amount of PM emission of an engine from increasing.

BRIEF DESCRIPTION OF THE DRAWINGS

FIGS. 3A and 3B are diagrams illustrating the relationship between an injection timing of an intake stroke injection and the compression ratio according to the embodiment of the invention, in which FIG. 3A is a timing diagram illustrating the relationship between the compression ratio and the injection timing.

FIGS. 4A and 4B are diagrams illustrating the relationship between an injection timing of a compression stroke injection and the compression ratio according to the embodiment of the invention, in which FIG. 4A is a timing diagram illustrating the relationship between the compression ratio and the injection timing.

MODE FOR CARRYING OUT THE INVENTION

Hereinafter, an embodiment of the invention will be described.

Figure 1:
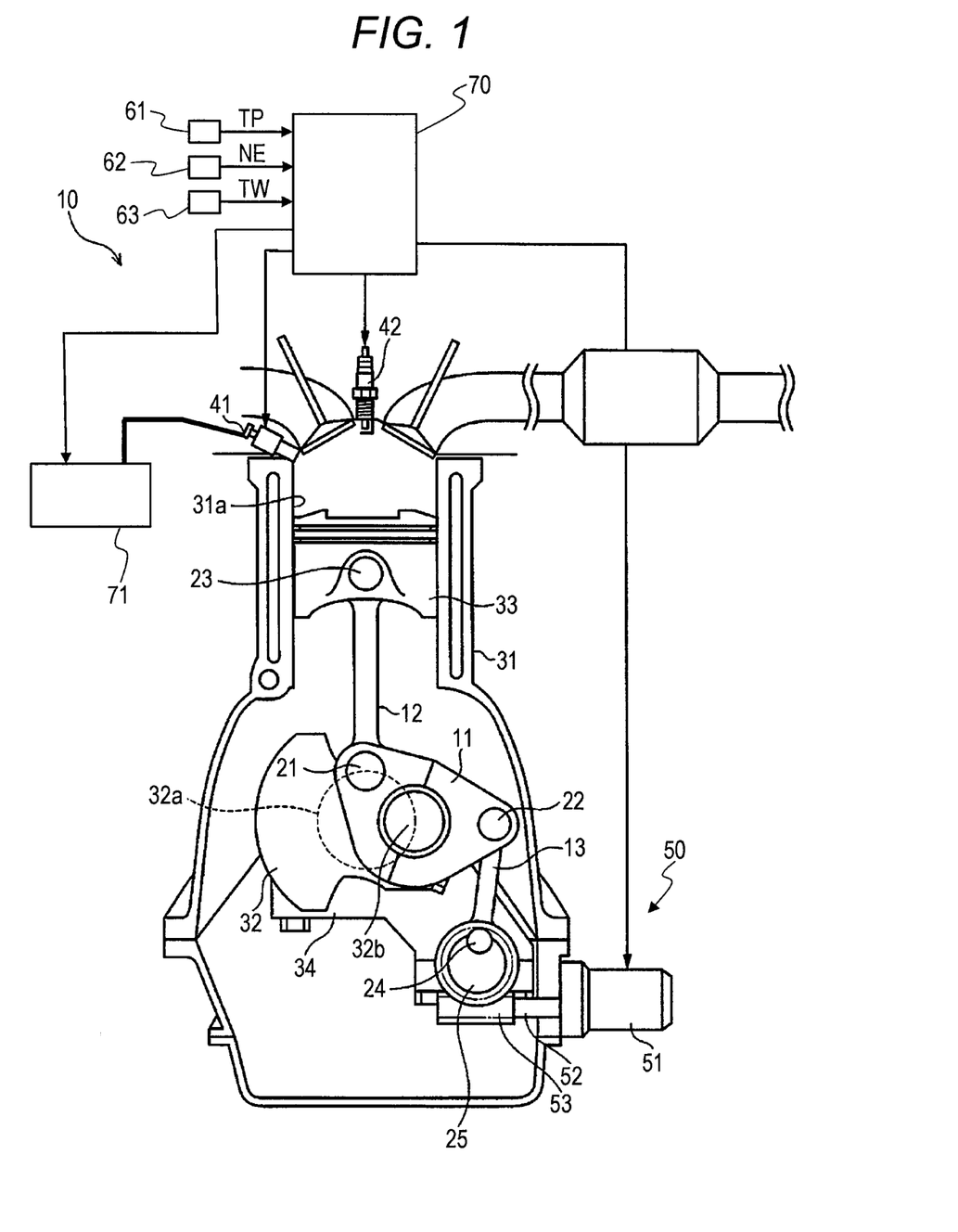
FIG. 1 is a system view of an engine according to an embodiment of the invention.

FIG. 1 is a diagram illustrating an example of an engine to which a control device and a control method according to the invention is applicable.

An engine 10 illustrated in FIG. 1 includes a compression ratio variable mechanism 50 that changes a top dead center position of a piston 33 and a fuel injector 41 that directly injects a fuel into a cylinder.

Compression ratio variable mechanism 50 is a mechanism that is configured to couple a crankshaft 32 and piston 33 using a lower link 11 and an upper link 12, regulate the movement of lower link 11 using a control link 13, and change a compression ratio by changing the top dead center position of piston 33.

Lower link 11 is configured to be dividable into two members, right and left parts, and attached to a crank pin 32b of crankshaft 32 through a coupling hole in the substantially center portion. Then, lower link 11 rotates about crank pin 32b as a central axis.

Crankshaft 32 includes a plurality of journals 32a and crank pins 32b. Journal 32a is supported to be freely rotated by a cylinder block 31 and a ladder frame 34. Crank pin 32b is decentered by a predetermined amount from journal 32a, and lower link 11 is coupled thereto to be freely rotated.

One end of lower link 11 is coupled to upper link 12 through a coupling pin 21, and the other end of lower link 11 is coupled to control link 13 through a coupling pin 22.

The lower end of upper link 12 is coupled to the one end of lower link 11 through coupling pin 21, and the upper end of upper link 12 is coupled to piston 33 through a piston pin 23.

Piston 33 reciprocates in a cylinder 31a of cylinder block 31 due to combustion pressure applied thereto.

Control link 13 is rotatably coupled to lower link 11 through coupling pin 22 provided at the end, the other end of control link 13 is coupled to a control shaft 25 through a coupling pin 24 in a decentralized manner, and control link 13 oscillates about coupling pin 24 as the center.

A gear is formed in control shaft 25, and is meshed with a pinion 53 provided in a rotation shaft 52 of an actuator 51. Then, control shaft 25 is rotated by actuator 51 and coupling pin 24 moves.

A controller 70 serving as the control device controls actuator 51 to make control shaft 25 rotated, change the top dead center position of piston 33, and change the compression ratio (mechanical compression ratio) of engine 10.

A fuel injector (fuel injection valve) 41, for example, is obliquely disposed to face piston 33 on a side of a combustion chamber such that an injection direction obliquely intersects with a shaft center of a cylinder bore, and directly injects the fuel into the cylinder.

Furthermore, fuel injector 41, for example, may be disposed to face downward in the substantially center portion of a ceiling face of the combustion chamber, and the invention is not limited to the configuration in which fuel injector 41 is disposed on the side of the combustion chamber.

Controller 70 controls a fuel injection of fuel injector 41 and controls an ignition timing of an ignition plug 42.

Controller 70 is configured to include a microcomputer that is provided with a CPU, a ROM, a RAM, an interface, and the like, and receives signals provided from various types of sensors, and outputs control signals to compression ratio variable mechanism 50, fuel injector 41, ignition plug 42, and the like.

As various types of sensors, engine 10 is provided with a load sensor 61 that measures an engine load TP, a rotation sensor 62 that measures a rotational speed NE of engine 10, a water temperature sensor 63 that measures a coolant temperature TW of engine 10, and the like.

Coolant temperature of engine 10 is a temperature that represents the temperature of engine 10.

Controller 70 has a function as an injection controller that changes the injection of fuel injector 41 to reduce the fuel adhering to a crown surface of piston 33 when the compression ratio is increased by compression ratio variable mechanism 50.

Since the amount of the fuel adhering to the crown surface of piston 33 among the fuel injected from fuel injector 41 varies according to an injection timing, penetration of fuel spray, and the like, a function of changing the injection timing and the penetration of the fuel spray is included in the function of changing the injection of fuel injector 41.

Thus, by reducing the fuel adhering to the crown surface of piston 33 when the compression ratio increases, the amount of PM emission of engine 10 at a high compression ratio can be reduced, and therefore the emission properties can be improved.

Figure 2:
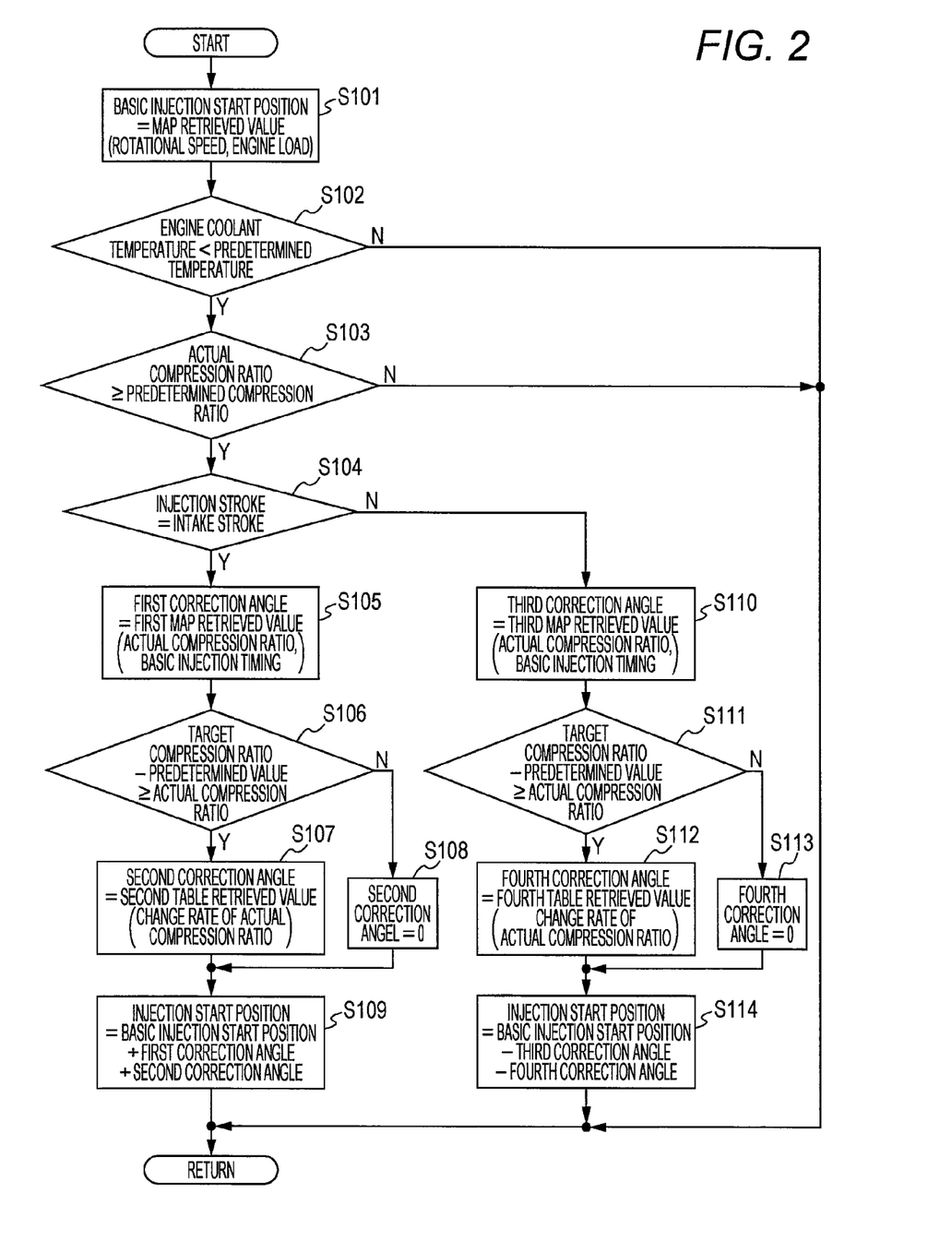
FIG. 2 is a flowchart illustrating a flow of control on an injection timing according to a compression ratio in the embodiment of the invention.

A flowchart of FIG. 2 illustrates an example of an injection timing control performed by controller 70 according to the compression ratio.

In Step S101 of the flowchart of FIG. 2, by retrieval in a map, or the like, controller 70 determines a basic injection start position that is a basic value of a timing at which fuel injector 41 starts to inject the fuel according to an operational state of engine 10 such as the engine load TP and the engine rotational speed NE.

The injection timing is set in the intake stroke or the compression stroke, and for example, will be represented by an advanced angle or a retarded angle from a reference crank angle position. Herein, a retarding direction will be denoted by a positive angle and an advancing direction will be denoted by a negative angle.

When the basic injection start position is determined in Step S101, controller 70 determines whether the coolant temperature TW is lower than a predetermined temperature in the subsequent Step S102. In other words, controller 70 divides a coolant temperature area into a high temperature area and a low temperature area using the predetermined temperature as a boundary value, and in Step S102, determines which of the high temperature area and the low temperature area the current coolant temperature belongs to.

In a case in which the coolant temperature TW of engine 10 is high, an atomizing performance of the fuel injected from fuel injector 41 is improved, and the amount of the fuel adhering to the crown surface of piston 33 becomes less than that in a cold state, at the same injection timing. On the contrary, in a case in which the coolant temperature TW is low, the amount of the fuel adhering to the crown surface of piston 33 becomes greater than that in a case in which the coolant temperature is high, at the same injection timing.

Thus, controller 70 determines in Step S102 whether the engine is in an engine temperature condition in which the amount of the fuel adhering to the piston crown surface exceeds an allowable level if the injection timing is not changed, based on the coolant temperature TW.

In other words, in a case in which the coolant temperature TW is higher than the predetermined temperature, controller 70 estimates that the amount of the fuel adhering to the piston crown surface can be prevented from exceeding the allowable level due to a high atomizing performance even though the injection timing is not changed. In a case in which the coolant temperature TW is lower than the predetermined temperature, controller 70 estimates that the amount of the fuel adhering to the piston crown surface is likely to exceed the allowable level if the injection timing is not changed in a direction to make the amount of the fuel adhering to the piston crown surface reduced.

To perform the above-described estimating process of controller 70, the predetermined temperature is determined in advance by experiments or simulations.

Therefore, in a case in which the coolant temperature TW is higher than the predetermined temperature, controller 70 determines that it is not necessary to change the injection timing to reduce the amount of the fuel adhering to the piston crown surface. Then, controller 70 terminates the routine in this state, and causes fuel injector 41 to control the injection timing based on a basic injection start timing.

On the other hand, in a case in which the coolant temperature TW is lower than the predetermined temperature, controller 70 determines that it is necessary to change the injection timing to reduce the amount of the fuel adhering to the piston, and the process proceeds to Step S103.

In Step S103, controller 70 determines whether an actual compression ratio changed by compression ratio variable mechanism 50 is equal to or greater than a predetermined compression ratio. That is, controller 70 divides a compression ratio area changed by compression ratio variable mechanism 50 into a high compression ratio area and a low compression ratio area using the predetermined compression ratio as a boundary value, and determines which of the high compression ratio area or the low compression ratio area the current actual compression ratio belongs to.

Controller 70 can obtain an angle position of control shaft 25 as a state amount corresponding to the actual compression ratio. In other words, controller 70 can convert a measured value of the angle position of control shaft 25 into the compression ratio, and use the compression ratio obtained by the conversion as the actual compression ratio. Furthermore, controller 70 can compare a measured value of the angle position of control shaft 25 with the angle position corresponding to the predetermined compression ratio, and determine whether it is a high compression ratio state.

Since compression ratio variable mechanism 50 is a mechanism that serves to change the compression ratio by changing the top dead center position of the piston, the position of the piston at the same crank angle position becomes lower as the actual compression ratio decreases, and as a result, a distance between fuel injector 41 and the piston crown surface increases. The fuel becomes unlikely to adhere to the piston crown surface as the distance between fuel injector 41 and the piston crown surface increases.

Thus, the predetermined compression ratio is determined in advance by experiments or simulations so that the high compression ratio state, in which the amount of the fuel adhering to the piston crown surface cannot be prevented from exceeding the allowable level if the injection timing is not changed, is detected as a state in which the actual compression ratio is equal to or greater than the predetermined compression ratio.

Therefore, in a case in which the actual compression ratio is less than the predetermined compression ratio, controller 70 determines that the distance between fuel injector 41 and the piston crown surface at the injection timing is long enough for preventing the amount of the fuel adhering to the piston crown surface from exceeding the allowable level. Then, controller 70 terminates the routine in this state, and causes fuel injector 41 to control the injection timing based on the basic injection start timing.

On the other hand, when the actual compression ratio is equal to or greater than the predetermined compression ratio, controller 70 determines that the amount of the fuel adhering to the piston crown surface is likely to exceed the allowable level if the injection timing is not changed, and the process proceeds to Step S104.

In Step S104, controller 70 determines whether a fuel injection timing of fuel injector 41 is set to an intake stroke injection or a compression stroke injection based on the basic injection start timing determined in Step S101.

Then, in the case of the intake stroke injection in which the fuel is injected in the intake stroke, the process of controller 70 proceeds to Step S105.

In Step S105, controller 70 sets a first correction angle HA1 based on the actual compression ratio and the basic injection start timing.

The first correction angle HA1 is a retarded-angle correction term of the basic injection start timing, which is set in the intake stroke. As the value of the first correction angle HA1 increases, the basic injection start timing is changed to be more retarded.

Figure 3A:
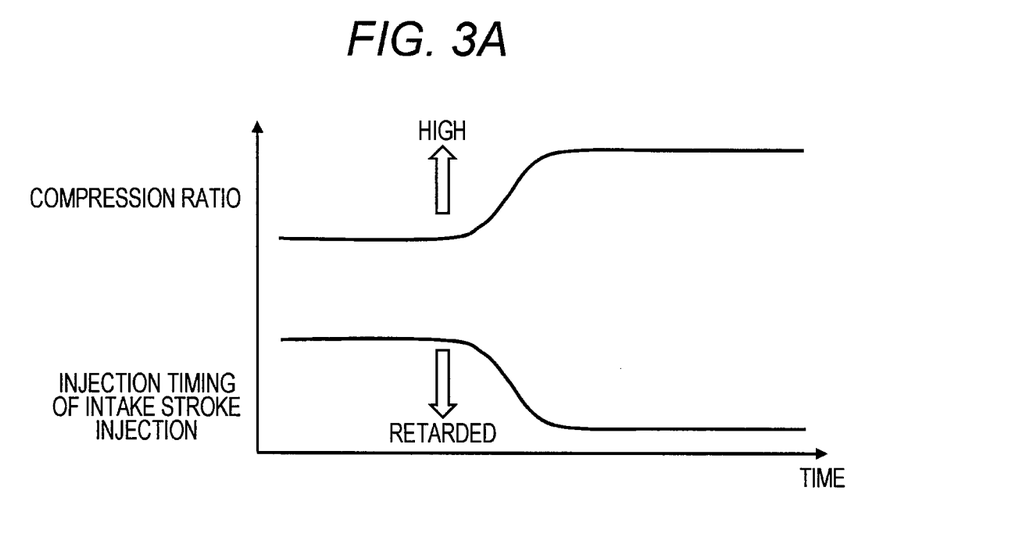

As illustrated in FIG. 3A, the first correction angle HA1 is set to be a greater value as the actual compression ratio increases, and to be greater value as the basic injection start timing approaches an exhaust top dead center TDC. As the first correction angle HA1 increases, the injection timing is retarded.

Herein, the amount of the fuel adhering to the piston crown surface can be prevented from exceeding the allowable level by setting the distance between fuel injector 41 and the piston crown surface at the injection start timing to be equal to or greater than the set value.

Figure 3B:
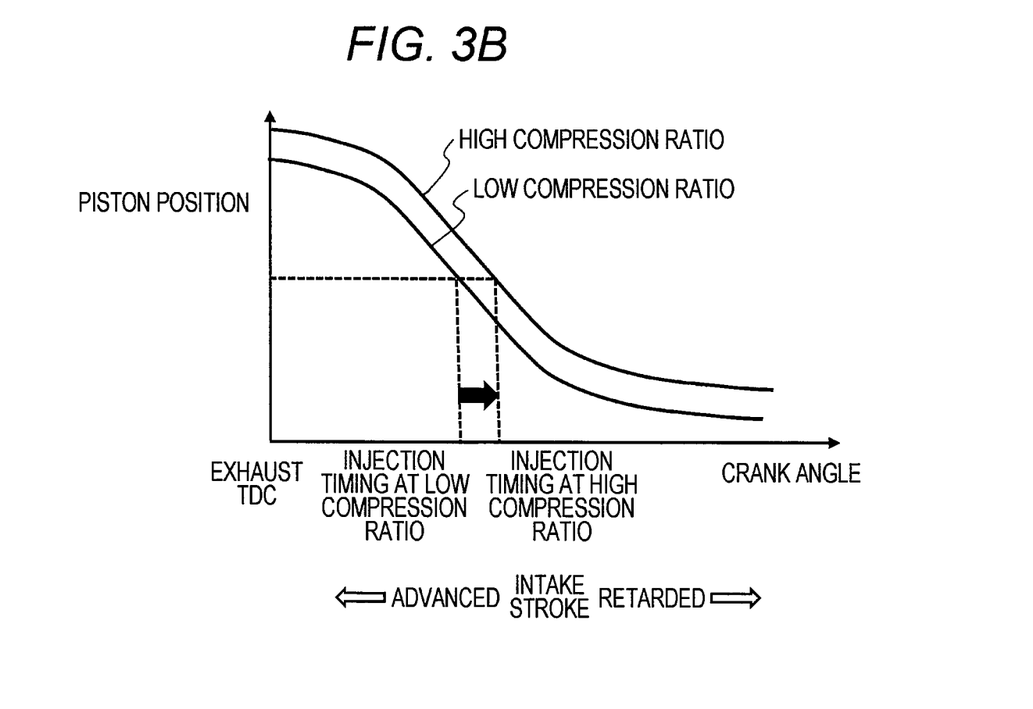
FIG. 3B is a chart illustrating the relationship between a crank angle and a piston position.

On the other hand, as illustrated in FIG. 3B, the position of the piston crown surface at the same injection timing becomes higher as the compression ratio increases. Furthermore, in the injection during the intake stroke in which the piston descends, the fuel injection is performed in a state in which the distance between fuel injector 41 and the piston crown surface is more shortened as the injection timing is advanced.

Therefore, the injection timing is retarded as the compression ratio increases in order to set the distance between fuel injector 41 and the piston crown surface at the injection start timing to be equal to or greater than the set value. In other words, the injection timing is necessarily set to be away from the exhaust top dead center.

In addition, as the basic injection start timing is retarded, a retarded correction amount of the injection timing necessary for setting the distance between fuel injector 41 and the piston crown surface at the injection start timing to be equal to or greater than the set value, decreases.

Thus, in Step S105, controller 70 sets the first correction angle HA1 to be greater as the actual compression ratio increases, and makes the injection start timing retarded as the actual compression ratio increases. In addition, controller 70 sets the first correction angle HA1 to be a greater value as the basic injection start timing approaches the exhaust top dead center TDC, and makes the injection start timing retarded as the basic injection start timing approaches the exhaust top dead center TDC.

When the first correction angle HA1 is set in Step S105, controller 70 determines in the subsequent Step S106 whether the compression ratio obtained by subtracting a predetermined value from a target compression ratio is equal to or greater than the actual compression ratio, that is, whether it is a transient state in which the actual compression ratio is increasing toward the increased target compression ratio.

In a case in which the actual compression ratio is changed to increase, the change of the fuel injection timing is lagged even when the first correction angle HA1 is set based on the actual compression ratio at the moment. Therefore, the compression ratio increases at a time point when the actual fuel injection is performed compared to the time point when the first correction angle HA1 was set.

Thus, in Step S106, in a case in which it is determined that it is the transient state in which the actual compression ratio is increasing, the process of controller 70 proceeds to Step S107, and controller 70 sets a second correction angle HA2 according to a change rate in an increase direction of the actual compression ratio.

Furthermore, controller 70 determines the change rate in the increase direction of the actual compression ratio based on a difference between the actual compression ratio at this time and the actual compression ratio at the last time.

Herein, as the change rate of the increase of the actual compression ratio increases, that is, as an amount of increase in actual compression ratio at the lagged time until the actual fuel injection starts increases, the second correction angle HA2 is set to be a greater angle, and the basic injection start timing is retarded.

With such a second correction angle HA2, a response lag in the transient state can be compensated, and it is possible to change the injection timing to be suitable for the actual compression ratio.

On the other hand, in a case in which it is not the transient state in which the actual compression ratio is increasing, the process of controller 70 proceeds to Step S108, and controller

70 sets the second correction angle HA2 to zero and cancels the correction performed using the second correction angle HA2.

In Step S109, controller 70 sets a fuel injection start position to a position retarded by the first correction angle HA1 and second correction angle HA2 from the basic injection start position. In other words, controller 70 calculates the fuel injection start position according to the following equation.

Fuel Injection Start Position=Basic Injection Start Position+First Correction Angle $HA1$+Second Correction Angle $HA2$ Then, when the fuel injection start position set in Step S109 is detected, controller 70 outputs an injection pulse signal to fuel injector 41.

As described above, in the intake stroke injection, the fuel injection start timing is retarded when the compression ratio increases, so that the injection start timing is set to be away from the exhaust top dead center and the amount of the fuel adhering to the piston crown surface is reduced.

In other words, in a case in which the injection timing is not changed when the compression ratio increases, the distance between fuel injector 41 and the crown surface of piston 33 at the injection timing might become shorter and the amount of the fuel adhering to the crown surface might increase. Therefore, the injection timing is changed in a direction to make the amount of the fuel adhering to the piston crown surface reduced. Herein, the direction to make the amount of the fuel adhering to the piston crown surface reduced becomes the retarding direction in the intake stroke injection.

With this configuration, it is possible to prevent the amount of the fuel adhering to the piston crown surface from increasing even when the compression ratio increases, and therefore, the amount of PM emission of engine 10 can be prevented from increasing.

In contrast, when it is determined that a compression stroke injection has been set in Step S104, the process of controller 70 proceeds to Step S110.

In Step S110, controller 70 sets a third correction angle HA3 based on the actual compression ratio and the basic injection start timing.

Furthermore, the third correction angle HA3 is an advanced-angle correction term of the basic injection start timing, which is set in the compression stroke. As the value of the third correction angle HA3 increases, the basic injection start timing is changed to be more advanced.

Figure 4A:
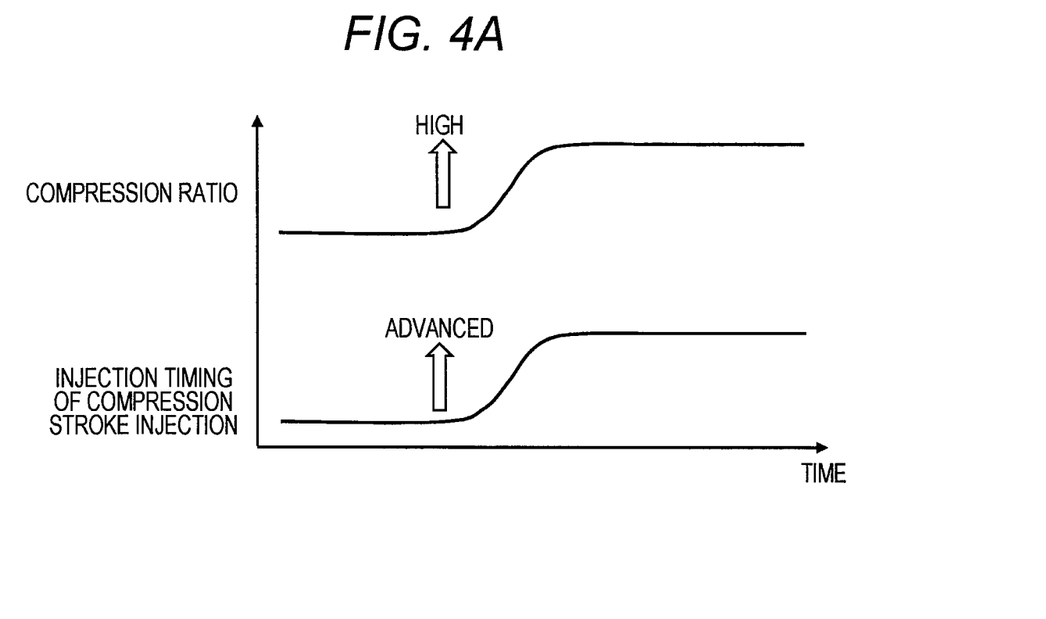

As illustrated in FIG. 4A, the third correction angle HA3 is set to be a greater value as the actual compression ratio increases, and to be a greater value as the basic injection start timing approaches a compression top dead center TDC. Furthermore, the injection timing is more advanced as the third correction angle HA3 increases.

As described above, it is possible to prevent the amount of the fuel adhering to the piston crown surface from exceeding the allowable level by setting the distance between fuel injector 41 and the piston crown surface at the injection start timing to be equal to or greater than the set value.

Figure 4B:
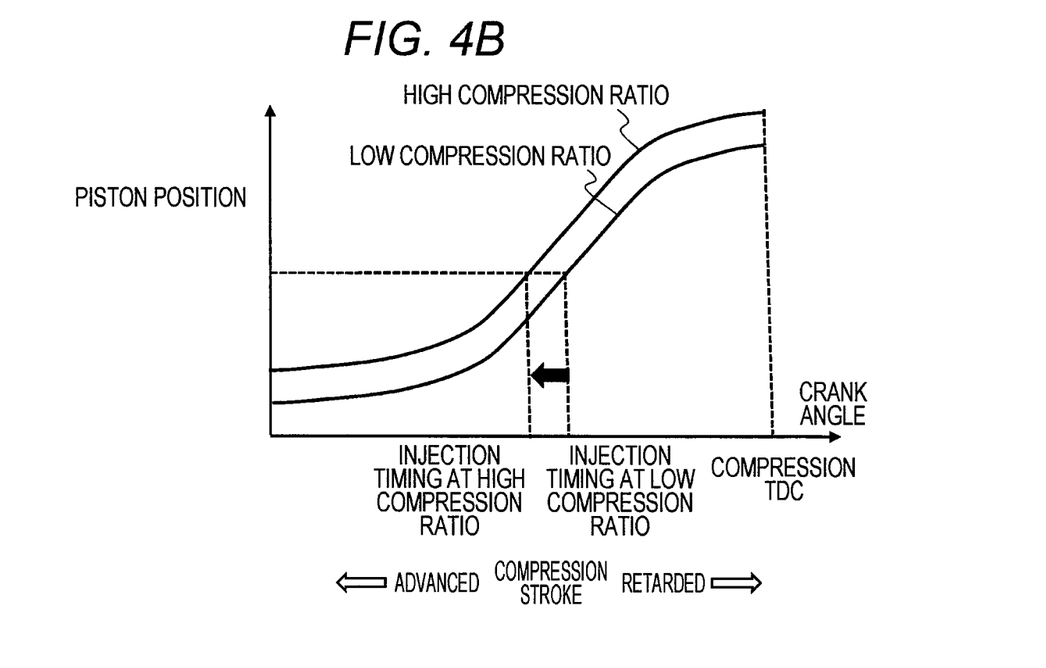
FIG. 4B is a chart illustrating the relationship between a crank angle and a piston position.

On the other hand, as illustrated in FIG. 4B, the position of the piston crown surface at the same injection timing becomes higher as the compression ratio increases. Furthermore, in the injection during the compression stroke in which the piston ascends, the fuel injection is performed in a state in which the distance between fuel injector 41 and the piston crown surface is shortened as the injection timing is retarded.

Therefore, the injection timing is more advanced as the compression ratio increases in order to set the distance between fuel injector 41 and the piston crown surface at the injection start timing to be equal to or greater than the set value. In other words, the injection timing is necessarily set to be away from the compression top dead center.

In addition, as the basic injection start timing is more advanced, an advanced correction amount of the injection timing necessary for setting the distance between fuel injector 41 and the piston crown surface at the injection start timing to be equal to or greater than the set value becomes smaller.

Thus, in Step S110, controller 70 sets the third correction angle HA3 to be a greater value as the actual compression ratio increases, and makes the injection start timing more advanced as the actual compression ratio increases. In addition, controller 70 sets the third correction angle HA3 to be a greater value as the basic injection start timing approaches the compression top dead center TDC, and makes the injection start timing more advanced as the basic injection start timing approaches the compression top dead center TDC.

In the subsequent Step S111, controller 70 determines whether the compression ratio obtained by subtracting a predetermined value from the target compression ratio is equal to or greater than the actual compression ratio, that is, whether it is a transient state in which the actual compression ratio is increasing toward the increased target compression ratio.

In a case in which the actual compression ratio is changed to increase, the change of the fuel injection timing is lagged even when the third correction angle HA3 is set based on the actual compression ratio at the moment. Therefore, the compression ratio increases at a time point when the actual fuel injection is performed compared to the time point when the third correction angle HA3 was set.

Thus, in Step S111, in a case in which it is determined that it is the transient state in which the actual compression ratio is increasing, the process of controller 70 proceeds to Step S112, and controller 70 sets a fourth correction angle HA4 according to a change rate in an increase direction of the actual compression ratio.

Herein, similarly to the second correction angle HA2, as the change rate of the increase of the actual compression ratio increases, that is, as an amount of increase in actual compression ratio at the lagged time until the actual fuel injection starts increases, the fourth correction angle HA4 is set to be a greater angle, and the basic injection start timing is more advanced.

On the other hand, in a case in which it is not the transient state in which the actual compression ratio is increasing, the process of controller 70 proceeds to Step S113, and controller 70 sets the fourth correction angle HA4 to zero and cancels the correction performed using the fourth correction angle HA4.

Then, in Step S114, controller 70 sets a fuel injection start position to a position advanced by the third correction angle HA3 and fourth correction angle HA4 from the basic injection start position. In other words, controller 70 calculates the fuel injection start position according to the following equation.

Fuel Injection Start Position=Basic Injection Start Position−Third Correction Angle $HA3$−Fourth Correction Angle $HA4$ As described above, in the intake stroke injection, controller 70 makes the fuel injection start timing advanced when the compression ratio increases, so that the injection start timing is set to be away from the compression top dead center and the amount of the fuel adhering to the piston crown surface is reduced.

In other words, in a case in which the injection timing is not changed when the compression ratio increases, the distance between fuel injector 41 and the crown surface of piston 33 at the injection timing might become shorter and the amount of the fuel adhering to the crown surface might increase. Therefore, the injection timing is changed in a direction to make the amount of the fuel adhering to the piston crown surface reduced.

Herein, the direction to make the amount of the fuel adhering to the piston crown surface reduced becomes the advancing direction in the compression stroke injection.

With this configuration, it is possible to prevent the amount of the fuel adhering to the piston crown surface from increasing even when the compression ratio increases, and therefore, the amount of PM emission of engine 10 can be prevented from increasing.

Furthermore, in order to change the injection of fuel injector 41 to reduce the amount of the fuel adhering to the piston crown surface, controller 70 may change the penetration of the fuel spray of fuel injector 41, rather than change the injection timing as described above.

If the penetration of the fuel spray is weakened when the distance between fuel injector 41 and the crown surface of piston 33 at the injection timing is shortened by increasing the compression ratio, a travel distance of the fuel spray is shortened and thus the amount of the fuel reaching up to the piston crown surface is reduced. Therefore, the amount of the fuel adhering to the piston crown surface can be prevented from increasing.

Figure 5:
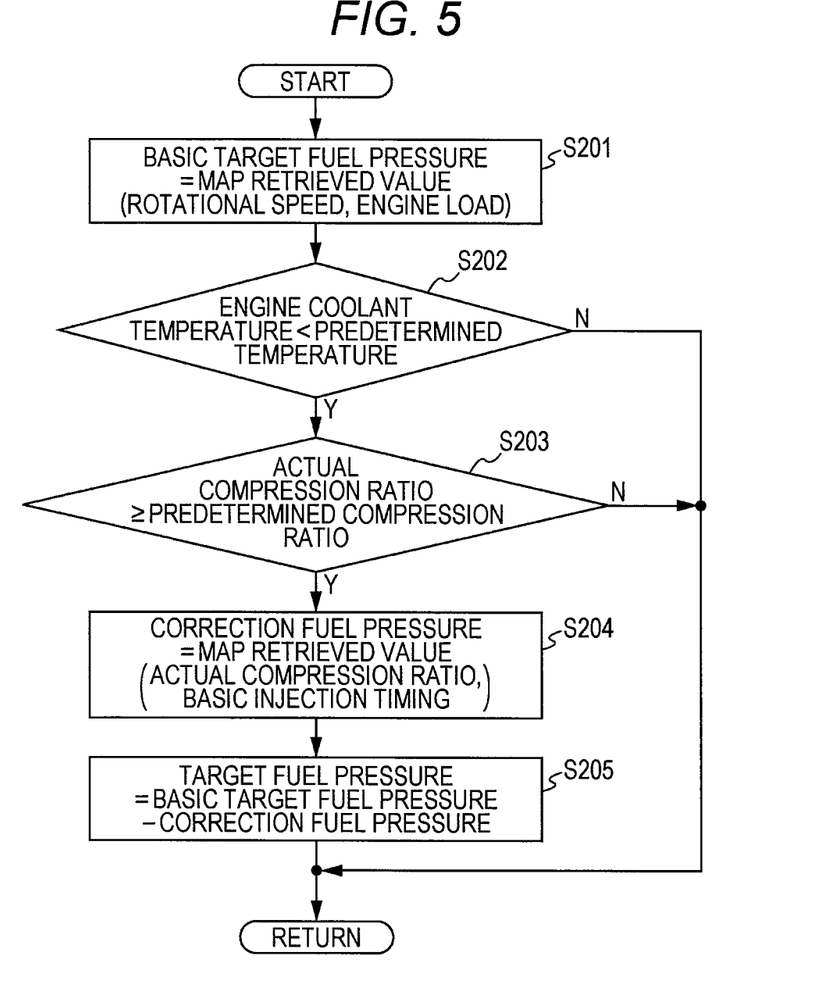
FIG. 5 is a flowchart illustrating a flow of control on a fuel pressure according to the compression ratio in the embodiment of the invention.

A flowchart of FIG. 5 illustrates an example of control on the penetration performed by controller 70 according to the compression ratio.

In the control illustrated in the flowchart of FIG. 5, controller 70 changes the penetration of the fuel spray by changing a pressure FP of the fuel supplied to fuel injector 41.

In other words, when the pressure FP of the fuel is increased, the penetration becomes stronger and therefore the amount of the fuel reaching up to the piston crown surface increases, so that the amount of the fuel adhering to the piston crown surface increases. In contrast, when the pressure FP of the fuel is reduced, the penetration becomes weak and the amount of the fuel reaching up to the piston crown surface decreases, so that the amount of the fuel adhering to the piston crown surface decreases.

For example, the change of the pressure FP of the fuel supplied to fuel injector 41 is performed by controlling a fuel pump included in a fuel supply apparatus 71 that pumps the fuel toward fuel injector 41.

In Step S201 of the flowchart of FIG. 5, by retrieval in a map, or the like, controller 70 determines a basic target fuel pressure FPb that is a target value of the pressure FP of the fuel supplied to fuel injector 41, according to the operational states of engine 10 such as the engine load TP, the engine rotational speed NE, and the coolant temperature TW.

In Step S202, similarly to Step S102, controller 70 determines whether the coolant temperature TW is lower than a predetermined temperature.

Then, in a case in which the coolant temperature TW is lower than the predetermined temperature and the atomizing performance of the fuel injected from fuel injector 41 is degraded, the process of controller 70 proceeds to Step S203.

In Step S203, similarly to Step S103, controller 70 determines whether an actual compression ratio changed by compression ratio variable mechanism 50 is equal to or greater than the predetermined compression ratio.

In a case in which the actual compression ratio is equal to or greater than the predetermined compression ratio, the process of controller 70 proceeds to Step S204 and controller 70 sets a fuel pressure correction value HP according to the actual compression ratio and an injection timing of fuel injector 41.

The fuel pressure correction value HP is a correction term subtracted from the basic target fuel pressure FPb. As the value of the fuel pressure correction value HP increases, the basic target fuel pressure FPb is corrected to be a lower pressure.

The fuel pressure correction value HP is set to be a greater value, that is, a value to make the pressure FP of the fuel corrected to be lower, as the actual compression ratio increases. Furthermore, the fuel pressure correction value HP is set to be a greater value as the injection timing approaches the top dead center.

Furthermore, in the intake stroke injection, the fuel pressure correction value HP is set to be a greater value as the injection timing approaches the exhaust top dead center, and in the compression stroke injection, the fuel pressure correction value HP is set to be a greater value as the injection timing approaches the compression top dead center.

As described above, the position of the piston crown surface at the same injection timing becomes higher as the compression ratio increases, and the fuel injection is performed in a state in which the distance between fuel injector 41 and the piston crown surface is more shortened. Therefore, the fuel easily adheres to the piston crown surface.

Thus, controller 70 reduces the pressure FP of the fuel as the compression ratio increases, to make the penetration of the fuel spray injected from fuel injector 41 weakened. Therefore, the travel distance of the fuel spray is shortened when the compression ratio is high, and the amount of the fuel adhering to the piston crown surface is prevented from increasing.

In addition, since the distance between fuel injector 41 and the piston crown surface is more shortened at the injection timing as the injection timing approaches the top dead center, controller 70 reduces the pressure FP of the fuel as the injection timing approaches the top dead center, to make the penetration of the fuel spray injected from fuel injector 41 weakened. Therefore, the travel distance of the fuel spray is shortened when the injection timing approaches the top dead center, and the amount of the fuel adhering to the piston crown surface is prevented from increasing.

After setting the fuel pressure correction value HP in Step S204, the process of controller 70 proceeds to Step S205, and controller 70 sets a final target value FPtg of the pressure of the fuel supplied to fuel injector 41 to a value obtained by subtracting the fuel pressure correction value HP from the basic target fuel pressure FPb.

In other words, controller 70 calculates the target value FPtg according to the following equation.

$$FPtg=FPb-HP$$

Then, controller 70 controls the amount of the fuel discharged from fuel supply apparatus 71, to make an actual fuel pressure approach the target fuel pressure FPtg.

As described above, when the compression ratio increases, it is possible to prevent the amount of the fuel adhering to the crown surface of piston 33 from increasing by changing the pressure FP of the fuel to be lowered to make the penetration weakened, and therefore the amount of PM emission of engine 10 can be prevented from increasing.

Furthermore, controller 70 can perform a process of setting the injection timing away from the top dead center according to the increase in compression ratio and a process of changing the pressure FP of the fuel according to the increase in compression ratio, in parallel or in a switching manner.

As an aspect of performing the injection timing control and the fuel pressure control in a switching manner, controller 70 can perform the control to reduce the fuel pressure while maintaining the injection timing when the compression ratio further increases, after the injection timing has been set to be away from the top dead center up to a limit angle in response to the increase of the compression ratio. Controller 70 can perform the control to set the injection timing to be away from the top dead center while maintaining the fuel pressure when the compression ratio further increases, after the fuel pressure has been reduced to a limit in response to the increase of the compression ratio.

Furthermore, the penetration of the fuel spray may be changed by changing the number of times of splits in the split fuel injections, rather than by changing the pressure FP of the fuel.

In the fuel injection, the penetration becomes stronger as the duration of injection becomes longer. Therefore, in a case in which the same amount of the fuel is injected, the penetration becomes weak when the injection is performed by being split into greater number of times so as to shorten the duration of injection.

Figure 6:
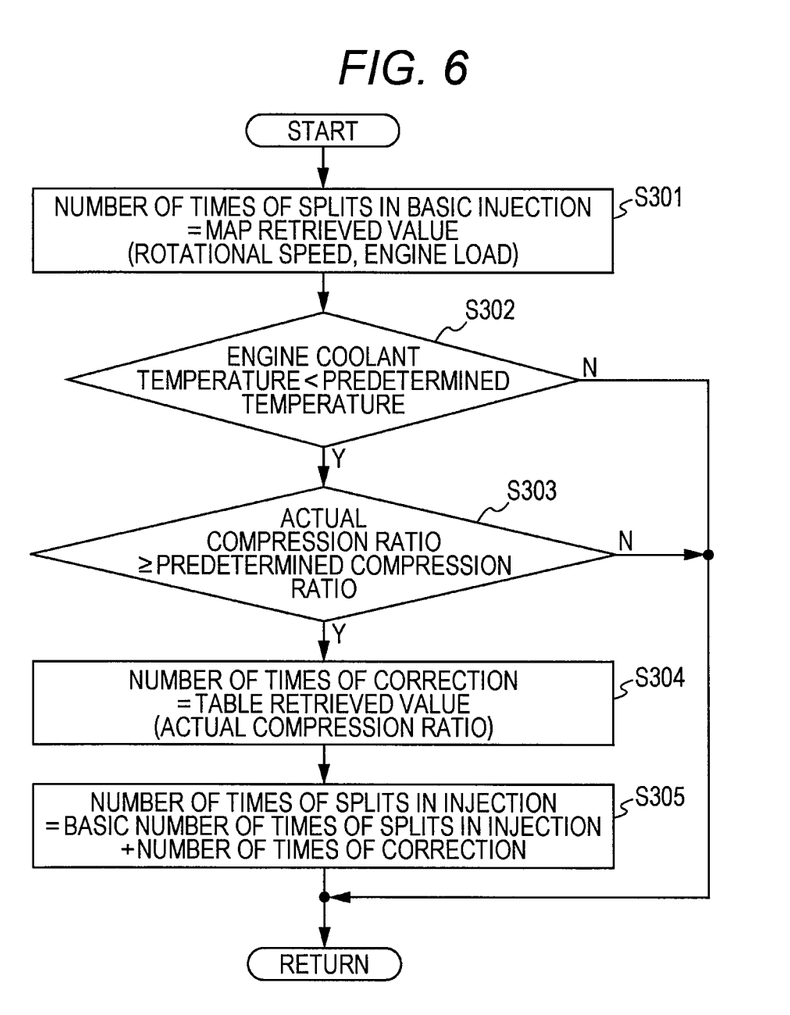
FIG. 6 is a flowchart illustrating a flow of control on the number of times of split injections according to the compression ratio in the embodiment of the invention.

A flowchart of FIG. 6 illustrates an example of control on the number of times of split injections performed by controller 70 according to the compression ratio.

In Step S301 of the flowchart of FIG. 6, by retrieval in a map, or the like, controller 70 determines a basic number of times of splits DN in the injection of fuel injector 41 according to the operational states of engine 10 such as the engine load TP, the engine rotational speed NE, and the coolant temperature TW.

The number of times of splits indicates the number of times an injection amount of fuel per one period is divided. For example, in a case in which the number of times of splits is two, an injection is performed for a half period of an injection pulse width corresponding to the amount of the fuel injection, and an injection is performed for the remaining half period after a predetermined interruption period elapses.

The fuel amount per injection may be ununiform. Furthermore, in a case in which the number of times of splits is set to three or more, the interruption period may be ununiform.

In addition, it is possible to uniformly set the basic number of times of splits DN determined in Step S301 to one so as not to perform the split injections.

In Step S302, similarly to Step S102, controller 70 determines whether the coolant temperature TW is lower than the predetermined temperature.

Then, in a case in which the coolant temperature TW is lower than the predetermined temperature and the atomizing (vaporizing) performance of the fuel injected from fuel injector 41 is degraded, the process of controller 70 proceeds to Step S303.

In Step S303, similarly to Step S103, controller 70 determines whether the actual compression ratio changed by compression ratio variable mechanism 50 is equal to or greater than the predetermined compression ratio.

Herein, in a case in which the actual compression ratio is equal to or greater than the predetermined compression ratio, the process of controller 70 proceeds to Step S304 and controller 70 sets a number of times for correction HN according to the actual compression ratio.

The number of times for correction HN is an addition correction term for the basic number of times of splits DN. As the value of the number of times for correction HN increases, the basic number of times of splits DN is corrected to a greater number of times and therefore the injection pulse width is more finely split.

The number of times for correction HN is set to a greater value as the actual compression ratio increases, and therefore the fuel injection is split into greater number of times and performed as the actual compression ratio increases.

As described above, as the compression ratio increases, the position of the piston crown surface at the same injection timing becomes higher. Therefore, the fuel injection is performed in a state in which the distance between fuel injector 41 and the piston crown surface is more shortened, so that the fuel easily adheres to the piston crown surface.

Thus, controller 70 increases the number of times of splits DN as the compression ratio increases, to make the injection period per one split injection shortened, so as to make the penetration of the fuel spray injected from fuel injector 41 weakened. With this configuration, the travel distance of the fuel spray can be shortened, and therefore the amount of the fuel adhering to the piston crown surface can be prevented from increasing.

After setting the number of times for correction HN in Step S304, the process of controller 70 proceeds to Step S305, and controller 70 sets a value obtained by adding the number of times for correction HN to the basic number of times of splits DN as a final number of times of splits DNtg in the split injection of fuel injector 41.

In other words, controller 70 calculates the final number of times of splits DNtg according to the following equation.

$$DNtg = DN + HN$$

Then, controller 70 performs the fuel injection by dividing the amount of the fuel injection per one period according to the number of times of splits DNtg.

As described above, when the compression ratio increases, controller 70 increases the number of times of splits DN in the split injection to make the penetration of the fuel spray weakened, so that the amount of the fuel adhering to the crown surface of piston 33 can be prevented from increasing and therefore the amount of PM emission of engine 10 can be prevented from increasing.

Controller 70 may perform, in parallel or in a switching manner, at least two kinds of control, out of the control to set the injection timing to be away from the top dead center according to the increase of the compression ratio, the control to change the pressure FP of the fuel to be lowered according to the increase of the compression ratio, and the control to increase the number of times of splits in the split injection according to the increase of the compression ratio.

For example, when the compression ratio further increases after increasing the number of times of splits DN up to a limit according to the increase of the compression ratio, controller 70 can perform the control to reduce the fuel pressure while maintaining the number of times of splits DN. When the compression ratio further increases after reducing the fuel pressure down to a limit according to the increase of the compression ratio, controller 70 can perform the control to increase the number of times of splits while maintaining the fuel pressure.

Hitherto, the contents of the invention has been specifically described with reference to the exemplary embodiment, and it is apparent that one skilled in the art can employ various modifications based on the basic technical concept and the teaching of the invention.

For example, the penetration of the fuel spray of fuel injector 41 can be changed by changing the fuel pressure and the number of times of splits, and may also be changed by changing an injection characteristic of fuel injector 41.

The change of the injection characteristic can be realized by providing with a first fuel injector and a second fuel injector and by switching the both injectors to perform an actual injection, in which the first fuel injector injects the fuel spray for a relatively strong penetration and the second fuel injector injects the fuel spray for a relatively weak penetration.

Furthermore, the penetration may be changed by providing fuel injector 41 with a mechanism that is capable of changing the penetration, for example, a mechanism that switches a lift position of a valve, and by controlling such a mechanism according to the compression ratio.

Furthermore, a correction angle of the injection start timing, a fuel pressure correction value, the number of times for correction for the split injection, and the like, may be set to be greater as the engine temperature decreases.

REFERENCE SYMBOL LIST

10 Engine
33 Piston
41 Fuel injector
50 Compression ratio variable mechanism
70 Controller

The invention claimed is:

1. A control device for an engine that includes a compression ratio variable mechanism for changing a top dead center position of a piston and a fuel injector for directly injecting a fuel into a cylinder,
the control device comprising:
an injection controller that sets an injection timing of the fuel injector to be away from the top dead center as an increase rate of a compression ratio by the compression ratio variable mechanism increases.

2. The control device for the engine, according to claim 1, wherein when the fuel injector injects the fuel in an intake stroke, the injection controller sets the injection timing of the fuel injector to be retarded as the increase rate of the compression ratio increases.

3. The control device for the engine, according to claim 1, wherein when the fuel injector injects the fuel in a compression stroke, the injection controller sets the injection timing of the fuel injector to be advanced as the increase rate of the compression ratio increases.

4. The control device for the engine, according to claim 1, wherein in a state in which a temperature of the engine is lower than a set temperature, the injection controller sets the injection timing of the fuel injector to be away from the top dead center as the increase rate of the compression ratio by the compression ratio variable mechanism increases.

5. The control device for the engine, according to claim 1, wherein in a high compression ratio state in which the compression ratio is equal to or greater than a predetermined compression ratio, the injection controller sets the injection timing of the fuel injector to be away from the top dead center as the increase rate of the compression ratio by the compression ratio variable mechanism increases.

6. A control method for an engine that includes a compression ratio variable mechanism for changing a top dead center position of a piston and a fuel injector for directly injecting a fuel into a cylinder,
the control method comprising the steps of:
controlling the compression ratio variable mechanism according to an operational condition; and
setting an injection timing of the fuel injector to be away from the top dead center as an increase rate of a compression ratio by the compression ratio variable mechanism increases.

7. The control method for the engine, according to claim 6, wherein the step of setting the injection timing to be away from the top dead center comprises the step of setting the injection timing of the fuel injector to be retarded as the increase rate of the compression ratio increases, when the fuel injector injects the fuel in an intake stroke.

8. The control method for the engine, according to claim 6, wherein the step of setting the injection timing to be away from the top dead center comprises the step of setting the injection timing of the fuel injector to be advanced as the increase rate of the compression ratio increases, when the fuel injector injects the fuel in a compression stroke.

9. The control method for the engine, according to claim 6, wherein the step of setting the injection timing to be away from the top dead center comprises the steps of:
determining whether a temperature of the engine is lower than a set temperature; and
setting the injection timing of the fuel injector to be retarded as the increase rate of the compression ratio by the compression ratio variable mechanism increases, in a state in which the temperature of the engine is lower than the set temperature.

10. The control method for the engine, according to claim 6, wherein the step of setting the injection timing to be away from the top dead center comprises the steps of:
determining whether the compression ratio is equal to or greater than a predetermined compression ratio; and
setting the injection timing of the fuel injector to be retarded as the increase rate of the compression ratio by the compression ratio variable mechanism increases, in a high compression ratio state in which the compression ratio is equal to or greater than the predetermined compression ratio.

* * * * *